United States Patent
Edwards et al.

(10) Patent No.: US 9,424,721 B2
(45) Date of Patent: Aug. 23, 2016

(54) POINT-OF-SALE SYSTEM

(71) Applicant: Square, Inc., San Francisco, CA (US)

(72) Inventors: Troy Edwards, Los Gatos, CA (US);
Lukas Skoog, San Francisco, CA (US);
Amish Babu, San Francisco, CA (US);
Jesse Dorogusker, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 459 days.

(21) Appl. No.: 13/797,548

(22) Filed: Mar. 12, 2013

(65) Prior Publication Data

US 2013/0279110 A1 Oct. 24, 2013

Related U.S. Application Data

(60) Provisional application No. 61/635,236, filed on Apr. 18, 2012.

(51) Int. Cl.
| | |
|---|---|
| *G06K 19/00* | (2006.01) |
| *G07G 1/00* | (2006.01) |
| *E05B 65/46* | (2006.01) |
| *G06K 7/01* | (2006.01) |
| *G07G 1/12* | (2006.01) |
| *G06F 1/16* | (2006.01) |

(52) U.S. Cl.
CPC ............ *G07G 1/0027* (2013.01); *E05B 65/461* (2013.01); *G06K 7/01* (2013.01); *G07G 1/0018* (2013.01); *G07G 1/12* (2013.01); *A47B 2210/06* (2013.01); *G06F 1/1632* (2013.01)

(58) Field of Classification Search
USPC .......................... 235/435, 439, 449, 487, 494
See application file for complete search history.

(56) References Cited

U.S. PATENT DOCUMENTS

| | | | |
|---|---|---|---|
| 4,786,785 | A | 11/1988 | Felt |
| 4,804,824 | A | 2/1989 | Saguchi |
| 5,371,344 | A | 12/1994 | Buie et al. |
| 5,723,850 | A | 3/1998 | Lambert |
| 7,764,491 | B2 | 7/2010 | Zhao et al. |
| 2003/0135406 | A1 | 7/2003 | Rowe |
| 2004/0043650 | A1 | 3/2004 | Yang et al. |
| 2005/0283403 | A1 | 12/2005 | Ramirez et al. |

(Continued)

FOREIGN PATENT DOCUMENTS

| | | |
|---|---|---|
| JP | 2004-234573 A | 8/2004 |
| JP | 2010-244429 A | 10/2010 |

(Continued)

OTHER PUBLICATIONS

Non-Final Office Action mailed Feb. 12, 2014, for U.S. Appl. No. 13/798,691, of Edwards, T., et al., filed Mar. 13, 2013.

(Continued)

*Primary Examiner* — Matthew Mikels
(74) *Attorney, Agent, or Firm* — Polsinelli PC

(57) ABSTRACT

A point-of-sale system includes a stand that supports a tablet computer. The tablet computer can run a merchant application to provide the typical functionality for a point-of-sale system. The stand can be rotatable to face either the merchant or the customer. The stand can incorporate a card reader. The tablet computer can be connected through a hub to other peripheral components, such as a controllable cash drawer, a printer and/or a bar code reader. The cash drawer can include a slidable drawer having sliding rails that are hidden from a top view of the drawer.

34 Claims, 11 Drawing Sheets

(56) References Cited

U.S. PATENT DOCUMENTS

| | | | |
|---|---|---|---|
| 2006/0226224 A1 | 10/2006 | Henry | |
| 2008/0266099 A1* | 10/2008 | Daily | G06Q 30/06 340/572.1 |
| 2009/0173790 A1 | 7/2009 | Hart et al. | |
| 2010/0262504 A1 | 10/2010 | Tamura | |
| 2011/0055032 A1 | 3/2011 | Chen | |
| 2011/0199727 A1 | 8/2011 | Probst | |
| 2012/0066079 A1* | 3/2012 | Falzone | G06Q 20/20 705/16 |
| 2013/0155595 A1* | 6/2013 | Herring | G07G 1/0018 361/679.21 |
| 2013/0278122 A1 | 10/2013 | Edwards et al. | |
| 2013/0282501 A1 | 10/2013 | Edwards et al. | |
| 2016/0132852 A1 | 5/2016 | Edwards et al. | |

FOREIGN PATENT DOCUMENTS

| | | |
|---|---|---|
| JP | 2011-54128 A | 3/2011 |
| WO | 93/18490 A1 | 9/1993 |
| WO | 97/09563 A1 | 3/1997 |
| WO | 97/10562 A1 | 3/1997 |
| WO | WO 97/10562 | 3/1997 |
| WO | 2008/027642 A2 | 3/2008 |
| WO | 2008/147457 A1 | 12/2008 |
| WO | 2013/158779 A2 | 10/2013 |

OTHER PUBLICATIONS

Non-Final Office Action mailed May 28, 2014, for U.S. Appl. No. 13/798,636, of Edwards, T., et al., filed Mar. 13, 2013.
Final Office Action mailed Aug. 29, 2014, for U.S. Appl. No. 13/798,691, of Edwards, T., et al., filed Mar. 13, 2013.
Ex Parte Quayle Action mailed Nov. 17, 2014, for U.S. Appl. No. 13/798,636, of Edwards, T., et al., filed Mar. 13, 2013.
Notice of Allowance mailed Feb. 10, 2015, for U.S. Appl. No. 13/798,636, of Edwards, T., et al., filed Mar. 13, 2013.
Non-Final Office Action mailed Mar. 13, 2015, for U.S. Appl. No. 13/798,691, of Edwards, T., et al., filed Mar. 13, 2013.
International Search Report and Written Opinion for PCT Application No. PCT/US2013/37005 mailed Nov. 8, 2013.
Examiner's Report for Canadian Patent Application No. 2870438 mailed Jan. 4, 2016.
Notice of Allowance mailed Oct. 8, 2015, for U.S. Appl. No. 13/798,691, of Edwards, T. et al., filed Mar. 13, 2013.
Non-Final Office Action mailed Apr. 12, 2016, for U.S. Appl. No. 14/982,840, Edwards, T., et al., filed Dec. 29, 2015.
First Office Action for Japnese Patent Application No. 2015-507152 mailed May 23, 2016 (English Translation).

* cited by examiner

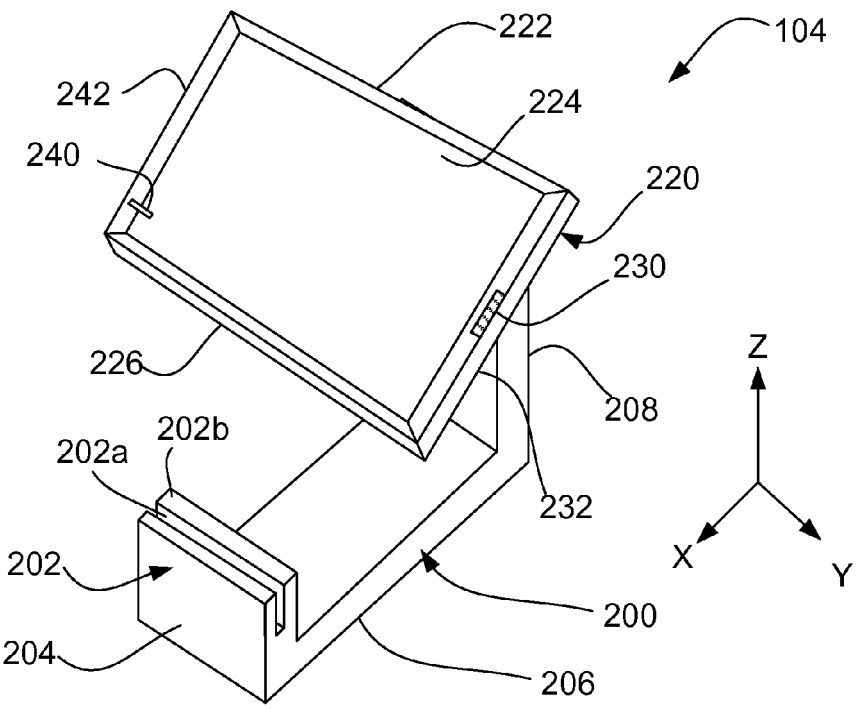
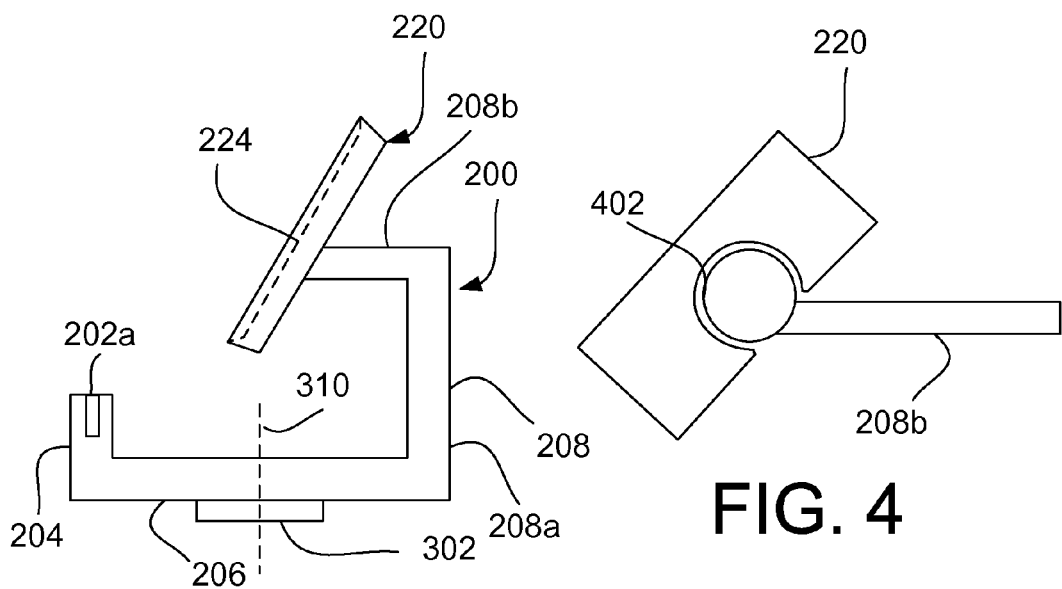

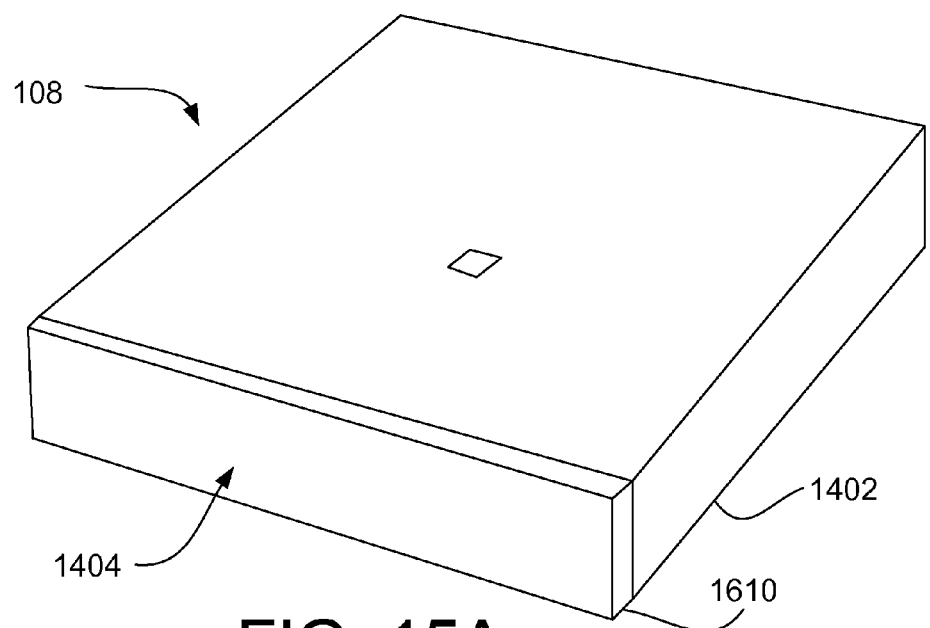
FIG. 15A
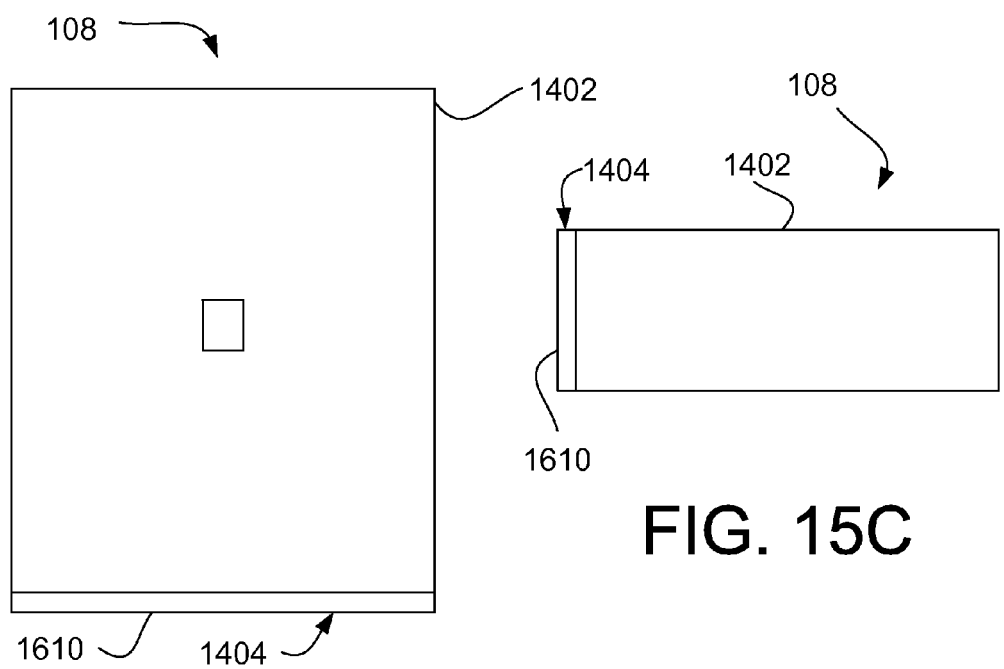
FIG. 15B
FIG. 15C

POINT-OF-SALE SYSTEM

CROSS-REFERENCE TO RELATED APPLICATIONS

This application claims the benefit under 35 U.S.C. §119 (e) of U.S. Patent Application No. 61/635,236, entitled "POINT-OF-SALE SYSTEM," filed Apr. 18, 2012, which is incorporated herein by reference in its entirety.

TECHNICAL FIELD

This disclosure relates to equipment for a point-of-sale system, including a stand for a tablet computer, a cash register drawer, and electronic and software architecture.

BACKGROUND

A merchant uses a point-of-sale system to conduct payment transactions. The typical point-of-sale system includes a card reader for payment cards (e.g., debit or credit cards) and a cash drawer.

If a customer pays by credit card, the merchant enters a transaction amount, and the merchant or the customer swipes the credit card in the card reader. Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

Alternatively, if the customer pays by cash, the merchant can receive and deposit the cash into the cash drawer. A merchant can use a printer to print out a receipt that details the transaction.

Some point-of-sale systems include a bar code reader so that the merchant can scan the bar code on the product. A computer in the point-of-sale system can identify the product and price from the bar code. The computer can also calculate the total transaction amount, including sales tax, when multiple products are purchased in a single transaction.

SUMMARY

As noted above, a conventional point-of-sale system can include a computer, a cash drawer, a receipt printer, a display, and a bar code reader. The point-of-sale system often includes a specialized keyboard (with keys labeled for actions in the transaction). In general, point-of-sale systems tend to be bulky and expensive.

Some of these issues can be addressed with point-of-sale system that includes a stand that supports a tablet computer. The tablet computer can run a merchant application to provide the typical functionality for a point-of-sale system, generally making the point-of-sale system lighter weight and more portable, and eliminating the need for various components such as the keyboard. The stand can be rotatable to face either the merchant or the customer, thus eliminating the need for a separate display device for the customer. The stand can incorporate a card reader, eliminating the need for a separate card reading device. The tablet computer can be connected through a hub to other peripheral components, such as a controllable cash drawer, a printer and/or a bar code reader.

In one aspect, a stand for supporting a tablet computer includes a frame including a horizontally extending bottom portion, a front portion extending vertically from a front end of bottom portion, and a back portion extending vertically from a back end of the bottom portion; a cradle attached to the back portion of the frame and configured to releasably support the tablet computer with a face of the tablet computer at an oblique angle relative to the bottom portion, a top surface of the front end of the frame positioned lower than a bottom edge of the cradle, the cradle including a data connector configured to mate to a data port of the tablet computer; a card reader including a vertical slot in the front portion of the frame, the slot parallel to a horizontal axis in a plane defined by the face of the tablet computer; and circuitry configured to direct signals from the card reader to the data connector.

Implementations may include one or more of the following features. The card reader may include a card stripe reader or a card chip reader. A near-field communication card reader may be positioned in the back portion. The vertical slot may extend across an entire width of the front portion. The oblique angle may be between about 40° and 65°. The cradle may be pivotally attached to the back portion of the frame and rotatable about a horizontal axis, and the slot may extend parallel to the horizontal axis. A base may support the frame, the frame may be pivotally attached to base and rotatable relative to the base about a vertical axis. The frame may be rotatable about the vertical axis between a first orientation and a second orientation. The first orientation may be a 180° angle relative to the first orientation. A detent mechanism may hold the frame at the first orientation and the second orientation. A stop may prevent the frame from rotation past the first orientation and from rotation past the second orientation. Wiring in the base may be configured to receive electrical power, and the wiring may be electrically connected to the circuitry to provide power to the data connector, the wiring remaining immobile when the frame rotates about the vertical axis. A cable may connect the wiring to the circuitry, and the cable may extend between a first stationary opening in the base and a second opening that rotates with the frame. The wiring may include a data and power cable extending from the base. An aperture may be configured to receive a mechanical fastener. The stand may be positioned on a table or counter and the fastener may extend through a hole in the table or counter into the aperture to secure the stand to the table or counter. The aperture may be aligned with the vertical axis. The frame may be pivotally attached to the base by a rotatable annular bearing and the aperture may extend through an opening through the bearing. The cradle may include a screw hole configured to align to an audio port of the tablet computer. A screw may be inserted into the screw hole and may have a portion extending into the audio port. The screw hole may be positioned on a side of the frame opposite the data connector. The frame may be weighted such that a center of gravity of the stand with the tablet computer supported on the cradle is in front of the bottom edge of the cradle. The frame may include a shell of a first material and a body of a second material that is denser than the first material, and the body may be located in the bottom portion of the frame inside the shell.

In another aspect, a stand for supporting a tablet computer includes a base; a frame supported on and pivotally attached to base to rotate relative to the base about a vertical axis between a first orientation and a second orientation, the frame including a horizontally extending bottom portion and a back portion extending vertically from a back end of the bottom portion; a cradle pivotally attached to the back portion of the frame to rotate about a horizontal axis, the cradle configured to removably support the tablet computer with a face of the tablet computer at an oblique angle relative to the bottom portion, the cradle including a data connector configured to mate to a data port of the tablet computer; and circuitry configured to provide power to the tablet computer through the data port.

In another aspect, a stand for supporting a tablet computer includes a base; a frame supported on and pivotally attached to base to rotate relative to the base about a vertical axis between a first orientation and a second orientation, the frame including a horizontally extending bottom portion and a back portion extending vertically from a back end of the bottom portion; a cradle pivotally attached to the back portion of the frame to rotate about a horizontal axis, the cradle configured to removably support the tablet computer with a face of the tablet computer at an oblique angle relative to the bottom portion, the cradle including a data connector configured to mate to a data port of the tablet computer; circuitry configured to provide electrical power to the tablet computer through the data port; and wiring in the base to receive electrical power, the wiring electrically connected to the circuitry, the wiring remaining immobile when the frame rotates about the vertical axis.

In another aspect, a stand for supporting a tablet computer includes a frame including a horizontally extending bottom portion and a back portion extending vertically from a back end of the bottom portion; a cradle attached to the back portion of the frame, the cradle configured to removably support the tablet computer with a face of the tablet computer at an oblique angle relative to the bottom portion, the cradle including a data connector configured to mate to a data port of the tablet computer and a hole configured to align to an audio port of the tablet computer; a fastener inserted into the hole and having a portion extending into the audio port of the tablet computer; and circuitry configured to provide power to the tablet computer through the data port.

In another aspect, a point-of-sale-system includes a cradle to support a tablet computer, the cradle including a data connector to mate to the tablet computer; an embedded host including a processor, wherein the embedded host is coupled with the data connector and is configured to communicate with the tablet computer; a card reader coupled to the embedded host; and a frame to support cradle, the embedded host, and the card reader.

Implementations may include one or more of the following features. The hub may include a chipset configured to communicate with the tablet computer, a mobile device port configured to couple the chipset to the embedded host, a connector for receiving power, and an enclosure surrounding the chipset, mobile device port and the connector for receiving power. The hub enclosure may include a printer port, wherein the printer port is configured to couple the chipset to a printer. The hub enclosure may further include a drawer port, wherein the drawer port is configured to couple the chipset to a drawer. The embedded host may be configured to open or close the drawer. The embedded host may be configured to track whether the drawer is open or closed. The card reader may include a flex circuit. The card reader may be a magnetic stripe reader. The magnetic stripe reader may include a first read head and a second read head, the first read head and the second read head attached to the flex circuit. The flex circuit may include a horizontal first portion, a vertical second portion extending on one side of a slot, and a vertical third portion extending on an opposite side of the slot. The first read head may be attached to the first second portion of the flex circuit and the second read head may be attached to the third portion of the flex circuit. The encrypted magnetic head readers may include a first encryption chip attached to the flex circuit adjacent the first read head and a second encryption chip attached to the flex circuit adjacent the second read head. The first encryption chip and the first read head may be encapsulated by a first potting and the second encryption chip and the second read head may be encapsulated by a second potting. The read heads may include encrypted magnetic head readers. The connector for receiving power may be a power cord.

In another aspect, a cash drawer for a point-of-sale-system includes a slidable drawer including a front face, a back face, a first side face, a second side face, and a bottom face, an inner shell attached to the first side face, the second side face, the front face, the back face, and the bottom face, and two sliding rails, the two sliding rails covered by the inner shell and extending parallel to the first and second side faces; a drawer enclosure having two rail supports to slidably support the rails such that the drawer is slidable between a closed position and an open position and a closed position; a latch movable between a first position in which the latch holds the slidable drawer in the closed position and a second position; and an actuator configured solenoid move the latch from the first position to the second position.

Implementations may include one or more of the following features. The actuator may be a solenoid. Circuitry may be configured to output a signal to an external port indicating whether the drawer is open or closed. A cable may couple the drawer to the drawer enclosure. The inner shell may be formed to support a tray within the drawer. The drawer enclosure may include an opening and a fastener, wherein the opening is configured to receive a mating feature of a stand and wherein a trigger of the fastener locks the stand enclosure in place. The opening may be formed to include a plug, and triggering of the fastener may release the plug. The opening may include a data port configured to mate to a data port of the stand. One of the two sliding rails may be attached to the first side face and another of the two sliding rails may be coupled to the second side face. The latch may include a first piece, a second piece, a first spring configured to urge the first piece to rotate in a first direction, and a second spring configure to urge the second piece to rotate in a second direction opposite the first direction. In the closed position a pin attached to the slidable drawer may fits into a slot in the first piece and the second piece may be positioned to prevent the first piece from rotation such that an edge of the slot prevents forward motion of the pin.

In another aspect, a cash drawer for a point-of-sale-system includes a slidable drawer including a front face, a back face, a first side face, a second side face, and a bottom face, and two sliding rails; a drawer enclosure having two rail supports to slidably support the rails such that the drawer is slidable between a closed position and an open position and a closed position, wherein in the closed position a back surface of the front face of the slidable drawer bears directly against a front surface of the drawer enclosure; a latch movable between a first position in which the latch holds the slidable drawer in the closed position and a second position; and an actuator configured solenoid move the latch from the first position to the second position.

In another aspect, a point-of-sale-system includes a tablet computer with a merchant application; and a stand including a cradle that supports the tablet computer and a frame that supports the cradle, the cradle configured to releasably support the tablet computer with a face of the tablet computer at an oblique angle, the cradle including a data connector configured that mates with a data port of the tablet computer, the stand rotatable about a vertical axis between a first orientation and a second orientation; and a card reader embedded in the stand; wherein the merchant application is configured to display on a screen of the tablet computer a first user interface to permit a merchant to identify items to be purchased by a customer and calculate a total amount due, and to display on a screen of the tablet computer a second user interface to permit a customer to authorize the transaction.

Implementations may include one or more of the following features. The second user interface may prompt the customer to insert the card into the card reader. The second user interface may prompt the customer to sign or to input a personal identification number (PIN).

Advantages of implementations may include one or more of the following as described herein. When using a point of sale device, a merchant conducts a transaction using a stand that supports a mobile device (e.g., a tablet computer). The stand can secure the tablet computer, so that the tablet computer is not easily removed from the stand. The stand can include a card reader (e.g., a magnetic stripe reader, NFC reader or EMV reader). The stand can swivel to face the screen of the tablet computer towards an employee of the merchant or towards a customer. While swiveling, the wires extending from the stand can remain immobile. The stand can connect to a drawer and other peripheral devices (e.g., an external printer) through a hub. The tablet computer can interface with other devices connected to the hub when the tablet computer is connected to the stand through a data connector. The amount of wiring can be reduced. A merchant can assemble a point-of-sale system without requiring specialized knowledge of electronics or software, and the point-of-sale system can be provided at lower cost. The stand can be portable, so that the merchant can easily set up the point-of-sale system at different locations. Electronics in the stand can be powered by the mobile device. In this case, there can be no wires extending from the stand. In some embodiments, the stand can be weighted so that the stand remains stable while a user interfaces with (e.g., touches) the tablet computer. The stand can be secured to a stationary object (e.g., a merchant's counter or table).

BRIEF DESCRIPTION OF THE DRAWINGS

FIG. 2 is a perspective view of an example stand.

FIG. 3 is a side view of the example stand.

FIG. 4 is a cross-sectional side view of the connection between the back portion of the frame and the cradle, according to an example.

FIG. 15A-C are a perspective, top, and side views of a closed drawer, according to an example.

Like reference numbers and designations in the various drawings indicate like elements.

DETAILED DESCRIPTION

Figure 1:
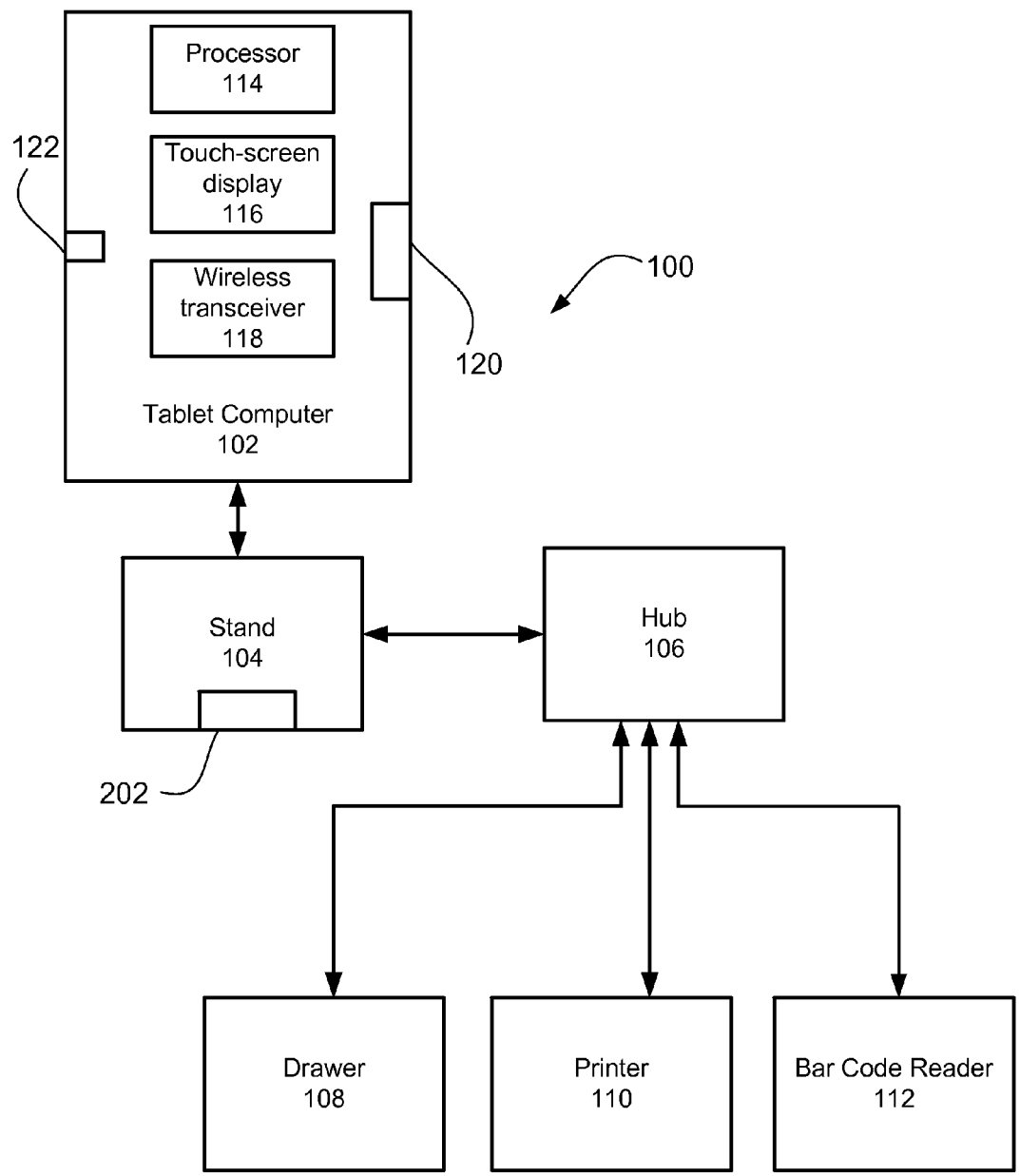
FIG. 1 is a schematic illustration of an example architecture for a point of sale system.

FIG. 1 is a schematic illustration of example architecture for a point of sale system 100. The architecture includes a tablet computer 102, a stand 104 for the tablet computer 102, a hub 106, a drawer 108, a printer 110 and a bar code reader 112. The stand 104 incorporates a card reader 202 (e.g., a magnetic stripe reader, Near Field Communication (NFC) reader or chip card reader, e.g., a Europay, MasterCard, and Visa (EMV) reader). A merchant might purchase each of the elements individually, e.g., the stand can be provided separately from the tablet computer, the drawer might be provided separately from the stand. Moreover, even in an assembled point-of-sale system 100, the hub 106, cash drawer 108, printer 110 and bar code reader 112 are optional components.

The tablet computer 102 runs software that can conduct payment transactions. The tablet computer 102 includes a processor 114, a touch-screen display 116, a wireless local area network transceiver 118, a physical interface 120 for electronic communication, and a physical interface to receive power (which can be integrated with the physical interface for electronic communication, e.g., in a Universal Serial Bus (USB) connector or other propriety connector). The tablet computer 102 can also include an audio port 122 to receive an audio jack. The physical interface 120 can be on an opposite edge of the tablet computer 102 from the audio port 122. For example, the tablet computer 102 can be an iPad tablet computer.

The tablet computer 102 is supported and detachably secured to the stand 104. In some implementations, the tablet computer 102 is electronically connected to the stand 104 through a data connector. The tablet computer 102 can communicate with circuitry in the stand 104, and vice-versa, as will be described below in reference to FIG. 8-10.

The stand 104 is a structure that supports and detachably secures the tablet computer 102. The stand 104 is part of a point-of-sale system that is prominently viewable by a customer. The stand 104 will be described further below in reference to FIGS. 1-12.

Optionally, the stand 104 connects to a hub 106. The hub 106 connects the tablet computer 102 to one or more peripheral devices. In some implementations, the peripheral devices include the drawer 108, e.g., a cash drawer, the printer 110 and/or the bar code reader 112. The hub 106 acts as a communication bridge between the tablet computer 102 and peripherals connected to the hub 106. The hub 106 will be described further below in reference to FIGS. 13A-B.

In some implementations, the hub 106 connects the stand 104 to the drawer 108. The drawer 108 is a structure that includes electronics to interface with the tablet computer 102.

In some implementations, the drawer 108 securely holds cash. The drawer 108 will be described below in reference to FIGS. 14-18.

In some implementations, the hub 106 connects the stand 104 to the printer 110. The tablet computer 102 can send data to the printer 110 through the hub 106. For example, the tablet computer 102 can be a merchant device that conducts payment transactions with a customer. The tablet computer 102 can send receipt data to the hub 106. The hub 106, in turn, can send the receipt data to the printer 110. The printer 110 can receive the receipt data and print a receipt based on the receipt data. The printer 110 can be a commercially available receipt printer with a USB connector that will plug into the hub 106.

In some implementations, the hub 106 connects the stand 104 to the bar code reader 112. The bar code reader 112 can be a commercially available bar code reader with a USB connector that will plug into the hub 106.

A conventional point-of-sale system can include a computer, a cash drawer, a receipt printer, a display facing the merchant, and a bar code reader. The merchant can scan in items for sale using the bar code reader. The computer receives each scan and looks up corresponding details about the item in an inventory database. After receiving the details from the database, the computer can show the details on the merchant-facing display. For example, the details can include an identification number, description, and price of each item being sold. After scanning in the items for sale, the merchant can calculate a total amount due to the merchant. The total amount due can include a tax and/or a tip. Once the amount is finalized, the computer can process the transaction and can use the printer to print a receipt. The customer can physically sign the receipt and return the receipt to the merchant.

An alternative conventional point-of-sale system includes an additional customer-facing display. The computer can display details of the transaction on both the customer-facing display and the merchant-facing display. In some implementations, the customer-facing display is attached to a customer-facing card reader. Therefore, instead of the merchant swiping the customer's card, the customer can swipe the card in the customer-facing card reader. Once scanning is complete, the customer-facing display can display a message that prompts the customer to swipe the card (e.g., "Please swipe your payment card"). After the customer swipes the card, the customer-facing display can display a message that prompts the customer to enter a signature (e.g., "Please sign here"). The customer can digitally sign on the customer-facing display using a stylus or finger.

In the point-of-sale system 100, the tablet computer 102 secured to the stand 104 acts as both a customer-facing display and a merchant-facing display. The tablet computer 102 can run a merchant application to process transactions. When scanning items, the merchant application causes the tablet computer 102 to act as a merchant-facing device as described above. Alternatively, the merchant application can display items for purchase on the screen of the tablet computer 102 and process touches for item selection. After item scanning or item selection is complete, the tablet computer 102 can calculate a total amount due, e.g., including tax and/or tip, and display the total amount to the user. The application then can display a prompt to receive a customer's signature, customer personal identification number (PIN) or other form of authorization or authentication for the transaction. When the merchant sees the prompt, the merchant can swivel the stand 104 to face the tablet computer 102 towards the customer. After the customer approves the transaction, e.g., signs on the touchpad of the tablet computer 102, the tablet computer 102 can display, to the customer, different methods of obtaining a receipt. For example, the methods include printing the receipt, emailing the receipt to an email of the customer, or allowing the customer an option to skip the receipt process.

The tablet computer 102 can process the transaction using the merchant application. The tablet computer 102 can connect to a wireless network (e.g., WiFi hotspot or cellular data connection). The tablet computer 102 can send the transaction information (including the signature and card data) to a payment processing server, which in turn communicates with a card network. The card network can send a message to the payment processing server indicating a status of the payment transaction (e.g., success, failure, or other state). In turn, the payment processing server can send the status to the tablet computer 102.

The tablet computer 102 can display a message indicating the status to the customer. After the customer finishes the transaction, the merchant can swivel the stand back to face the tablet computer 102 towards the merchant.

FIG. 2 is a perspective view of an example stand 104, and FIG. 3 is a side view of the example stand 104. The stand 104 includes a cradle 220 to support and secure the tablet computer, and a frame 200 to support the cradle 220.

The frame 200 includes a front portion 204, a back portion 208, and a horizontally extending bottom portion 206. The back portion 208 extends vertically from a back end of the bottom portion 208. The front portion 204 extends vertically from a front end of the bottom portion 208. The front portion 204 extends upwardly from the bottom portion 206 in front of the cradle 220. Each of the front portion 204 and bottom portion 206 can be a generally planar body. The back portion 208 can include a single vertically extending portion 208a that connects to the cradle 220, or can include the vertically extending portion and a horizontal strut 208b (see FIG. 3) that connects to the cradle 220. The vertically extending portion 208a can be directly beneath the cradle 220, or the vertically extending portion 208a can be positioned behind the cradle 220.

The front portion 204 of the frame 200 includes a card reader 202. The card reader 202 includes a slot 202a to receive a card. The card reader 202 can process payment cards or devices. For example, a merchant or customer can swipe a payment card through the slot 202a. Data read by the card reader 202 can be directed to a merchant application running on the tablet computer 102. The card reader 202 can be a magnetic stripe reader, a chip card reader, e.g., an EMV reader, or NFC reader. In some implementations, the card reader 202 can include one or more types of readers. For example, the card reader 202 can have the capability to read magnetic stripes and include a mechanism to read EMV cards and/or NFC devices. Alternatively, the card reader 202 can be a magnetic reader and another card reader can be included in another part of the stand 104, e.g., an NFC reader in the back portion 208.

The slot 202a is formed in the front portion 204 of the frame 200, e.g., in a top surface 202b of the front portion 204. The slot 202a can be oriented vertically, e.g., in a plane parallel to the front surface of the front portion 204. The vertical slot 202a can extend across the entire width of the front portion 204. In some implementations, the slot 202a is or extends parallel to a horizontal axis in a plane defined by the face of the tablet computer when held by the cradle 220.

The cradle 220 attaches to the back portion 208 of the frame. The cradle 220 is configured to support the tablet computer 102. A front face of the cradle 220 can include a rim 222 and a recessed region 224. The rim 222 is configured to engage and support the edge of the back surface of the tablet computer 102. The surface of the recessed region 224 can be shaped to mate to the back surface of the tablet computer 102, i.e., come into contact across all or a substantial portion of the back surface of the tablet computer 102. Although FIG. 2 illustrates the cradle 220 as a generally plate-shaped body with a front face that extends across the back surface of the tablet computer, in some implementations there can be apertures through the front face of the cradle. For example, the cradle 220 could support the tablet computer 102 substantially only at its edges (e.g., most of the recessed region could be replaced by an aperture through the cradle 220).

In some implementations, the touch-screen face of the tablet computer 102 is positioned at an oblique angle, e.g., about 40-65°, relative to the bottom portion 206 when the tablet computer is held by the cradle 220. In some implementations, a top surface 202b of the front portion 204 of the frame 200 is positioned lower than a bottom edge 226 of the cradle 220.

The cradle 220 includes a data connector 230 that is configured to mate to a data port 120 (see FIG. 12) of the tablet computer 102. The data connector 230 can project inwardly from the rim 224. The data connector 230 can be located on the portion of the rim 224 at a first side edge 232 of the cradle 220.

A pin 240 can project from the cradle 220. The pin 240 is configured to mate to an audio port 122 of the tablet computer 102. The pin 240 can project inwardly from the rim 224. The pin 240 can be a separate piece that extends through an aperture 1204 (see FIG. 12) in the rim of the cradle 220. The aperture 1204 and the pin 240 can be located on the portion of the rim 224 at second first side edge 242 of the cradle 220. The second side edge 242 can be on an opposite side of the cradle 220 from the first side edge 232.

In some implementations, the frame 200 is weighted such that the stand's center of gravity is towards the front portion 204 of the frame 200. The center of gravity can at least be in front of the bottom edge of the cradle 220. For example, a body 250 (see FIG. 9) of dense material, e.g., a zinc plate, can be embedded in the front half of the frame 200, e.g., in the front half of the bottom portion 206. Alternatively or in addition, the front half of the frame 200 can be built from denser material than the back half of the frame, e.g., light aluminum or plastic. In addition, the back portion 208 can be thinner than the front portion 204 and bottom portion 206. With the stand 104 weighted in this way, a user can interface with the tablet computer, e.g., touch the screen with varying amounts of force, while both the stand 104 and the tablet computer 102 will remain stable.

FIG. 4 is a cross-sectional side view of the connection between the back portion 208 of the frame 200 and the cradle 220. As shown, the cradle 220 can be pivotally connected to the back portion 208 of the frame 200. For example, the cradle 220 can be connected by a cylindrical rod and socket joint 402 to the frame. In some implementations, the pivotal connection is configured so that the cradle 220 can rotate about a horizontal axis, e.g., the rod of the rod and socket joint 402 extends substantially horizontally. For example, when facing the stand 104, a user can tilt the tablet computer forward or backward. The pivotal connection can provide the cradle 220 with at least a 25° range of motion. In some implementations, the cradle 220 can rotate about an axis normal to the face of the tablet computer 102. For example, when facing the stand 104, the user can also rotate the tablet computer clockwise or counterclockwise (e.g., place the tablet computer device in a landscape or a portrait orientation).

Returning to FIG. 3, in some implementations, the stand 104 includes a base 302 that rotatably supports the frame 200 and cradle 220. The base 302 can be circular and can have a width about equal to the width of the bottom portion 206 of the frame. The base 302 will be described further below in reference to FIGS. 5-7.

Figure 5:
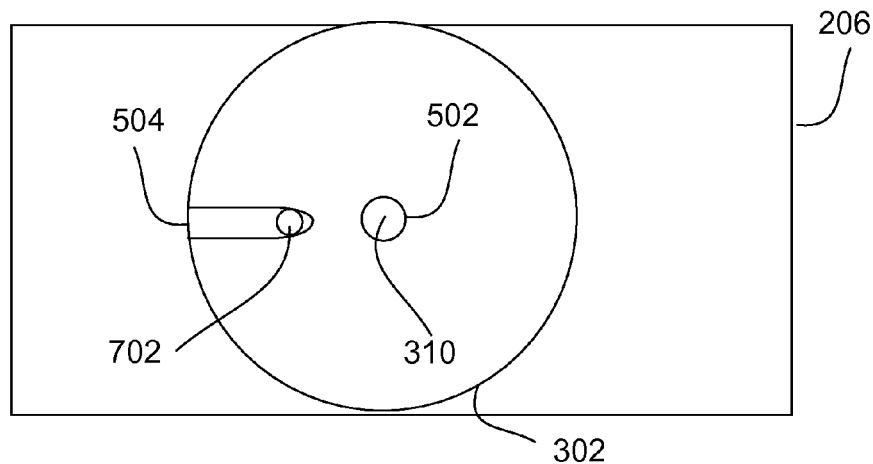
FIG. 5 is a bottom view of the base of the stand, according to an example.

FIG. 5 is a bottom view of the base 302 of the stand 104. The base 302 is attached to the bottom portion 206 of the frame 200. In some implementations, the base 302 supports and is pivotally attached to the frame 200. The base can rotate the frame 200 about a vertical axis 310 (see FIG. 3). The center of gravity of the stand 104 can be in front of the vertical axis 310. For example, the frame 200 can be supported on a rotatable bearing 602 (see FIG. 6), such as a Lazy Susan bearing, in the base 302. This configuration permits the base to have a fairly low profile, e.g., be less than about half an inch in height.

In some implementations, the base 302 includes stops so that the frame 200 is limited to rotation between a first orientation and a second orientation. Alternatively or in addition, the base 302 can include detent mechanisms to hold the frame 200 in the first orientation or second orientation unless a sufficient torque is applied by the user. In some implementations, the second orientation is at an angle of 180° relative to the first orientation. For example, the stand 104 can be resting on a table that separates a customer from a merchant. A tablet computer 102 on the stand 104 can be facing an employee of the merchant. After conducting a transaction, the merchant can turn the stand 104 by 180° to face the tablet computer 102 towards the customer, e.g., to obtain the customer's signature or to show details of the transaction. After the customer is finished interfacing with the tablet computer 102, the merchant can return the stand 104 to its original position. Other preset angles, e.g., 90° or 135°, between the first orientation and second orientation are possible.

In some implementations, the base 302 includes an aperture 502 aligned with the vertical axis 310. The aperture 502 can extend through the rotatable bearing 602 (see FIG. 6). The aperture is configured to receive a mechanical fastener, e.g., a screw or bolt. The mechanical fastener can lock the base, and therefore the stand 104, to a stationary object (e.g., a table or counter of the merchant). In some implementations, the aperture is threaded to receive a screw. For example, a hole can be drilled through a support (e.g., the table or counter) and the screw can be inserted through the hole and into the threaded aperture and tightened to hold the stand 104 on the support. In alternative implementations, an adhesive is applied to the base 302, or to another body that is held on the base 302 by the mechanical fastener.

The base 302 includes wiring to receive electrical power. The wiring connects the circuitry in the stand 104 and provides power to the data connector in the stand 104. The circuitry is described below in reference to FIGS. 8-10.

Figure 6:
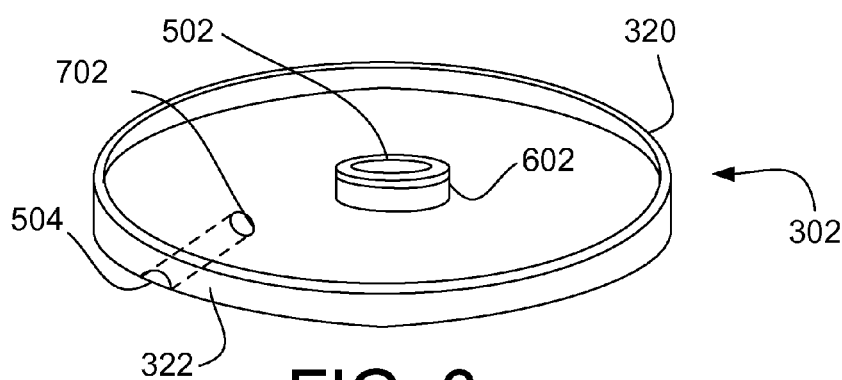
FIG. 6 is a perspective view of the base, according to an example.

FIG. 6 is a perspective view of the base 302. The base 302 can include a side wall 320 to hide the bearing 602 and any cabling inside the base. Referring to FIGS. 5 and 6, in some implementations, a groove 504 is formed in the bottom surface of the base 302. A cable for power and/or data can extend through the groove 504. One end of the groove 504 is flush with the outer surface 322 of the side wall 320 of the base 302, and the other end of the groove ends in an external opening 702 into the interior of the base 302. When the frame 200 rotates about the vertical axis 310, the groove 504 remains stationary, so that a portion of the cable that extends from the stand 104 does not move. This not only prevents wear and tear on the cable and prevents the cable from tangling with other components on the table or counter of the merchant, but also provides a cleaner visual experience for a user of the stand 104. In some implementations, the cable includes a data wire and a power wire (e.g., to power circuitry in the stand 104).

Figures 7A, 7B:
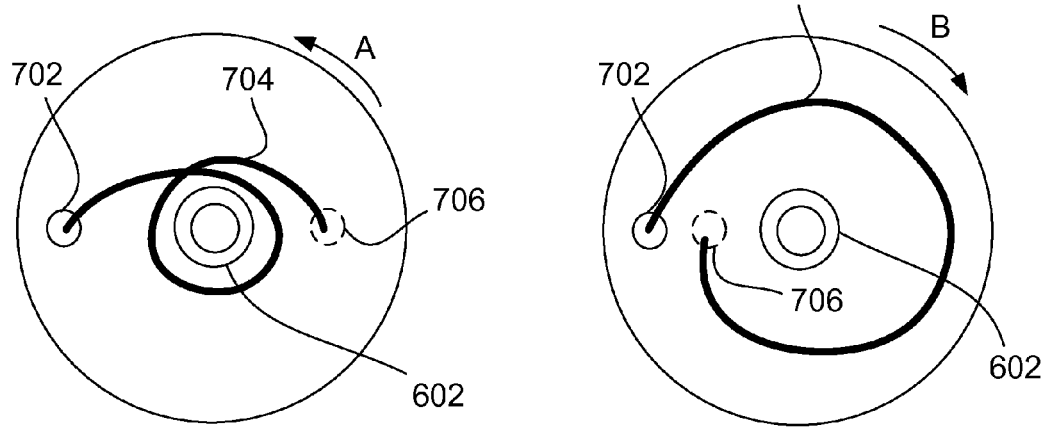
FIG. 7A is a view of an example cable in the base when the frame is in a first orientation.
FIG. 7B is a view of an example cable in the base when the frame is in a second orientation that is 180° relative to the first orientation.

FIG. 7A is a view of an example cable 704 in the base 302 when the frame is in a first orientation. As noted above, the groove 504 leads the cable 704 into an external opening 702.

The cable 704 runs from the external opening 702 to an internal opening 706. The internal opening 706 can lead the cable 704, which carries power and/or data, to circuitry in the stand 104. When the frame 200 rotates (e.g., clockwise or counter-clockwise), the external opening 702 does not move whereas the internal opening 706 does move.

FIG. 7B is a view of an example cable 704 in the base 302 when the frame is in a second orientation that is 180° relative to the first orientation. Although FIGS. 7A and 7B illustrate the cable 704 as looped around the bearing 602, this is not necessary.

In some implementations, the detent mechanism or stops in the base restrict rotation depending on the frame's orientation. For example, the frame in the first orientation can be restricted to only rotate in a counter-clockwise direction A (see FIG. 7A) to reach the second orientation. The frame in the second orientation can be restricted to only rotate in a clockwise direction B (see FIG. 7B) to reach the first orientation. Limiting rotation of the frame helps prevent the cable 704 inside the base 302 from being tangled or damaged when the frame rotates.

Figure 8:
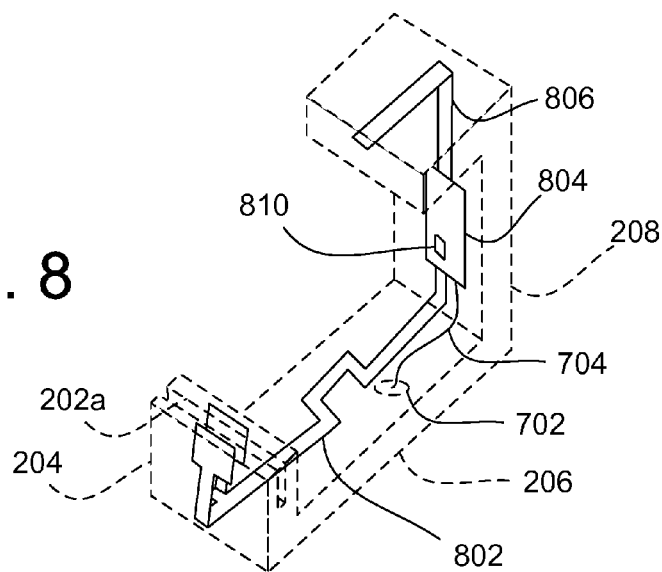
FIG. 8 is a perspective view of example circuitry in the frame (shown in phantom) of the stand.
Figure 9:
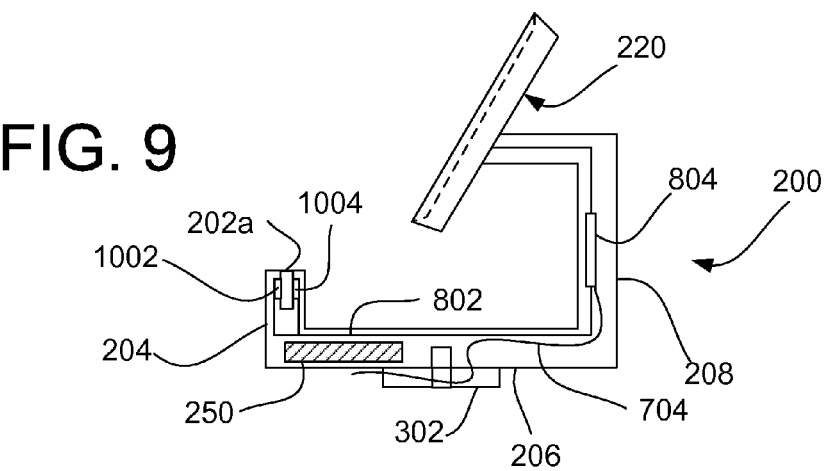
FIG. 9 is a cross-sectional side view of example circuitry in the stand.

FIG. 8 is a perspective view of example circuitry in the frame 200 (shown in phantom) of the stand 104. FIG. 9 is a cross-sectional side view of example circuitry in the stand 104. Referring to FIGS. 8 and 9, the circuitry can include an embedded host 804, a data connector 806, and a card reader 802 (e.g., a magnetic stripe reader, EMV reader, NFC reader, or other payment reader).

The embedded host 804 is a central processing device that controls communications between the tablet computer 102 and other external devices (e.g., a printer 110 or a cash drawer 108). The embedded host includes a processor 810. The embedded host 804 can be positioned in the back portion 208 of the frame, although other locations such as the bottom portion 208 are possible. As mentioned above in reference to FIGS. 7A and 7B, the internal opening 702 leads a cable 704, which provides electrical power and/or data, to the embedded host 804. If a tablet computer 102 is connected to the cradle 220, the embedded host 804 can communicate with the tablet computer 102 through the data connector 806. The embedded host 804 also directs signals from the card reader 802 to the tablet computer. For example, if a customer uses a card at the card reader 802, e.g., a magnetic, NFC, or chip card reader, e.g., an EMV reader, the embedded host 804 receives the card data and sends it to the tablet computer through the data connector 806.

In some implementations, the first end of the cable 704 is connected to the embedded host 704, and the second end of the cable 704 is connected to a hub. The hub will be described below in reference to FIGS. 13A-B. The embedded host 804 can control devices connected to the hub. A cash drawer 108 can be connected to the hub 106. The embedded host 804 can control whether to open the drawer 108. For example, when conducting a transaction, a merchant application running on the tablet computer 102 can choose to process payment with cash or card. If a cash payment is selected, the application can send a signal to the embedded host 804, which can open the cash drawer 108. When the cash drawer 108 closes, the drawer 108 can send a signal to the embedded host 804, which can notify the application running on the tablet computer 102. In another example, a printer 110 can be connected to/in communication with the hub 106. The embedded host 804 can receive data from the tablet computer 102 and communicate with the printer 110 to print the data. In another example, a bar code reader 112 can be connected to the hub 106. The embedded host 804 can the signals from the bar code reader 112 and pass them to the tablet computer 102.

The embedded host 804 can also read a state from the drawer 108 (e.g., whether the drawer is open or closed). For example, the application running on the tablet computer 102 can request the embedded host 804 to retrieve the state of the drawer 108 at a certain time. The embedded host 804 can send the state of the drawer 108 to the application, which periodically saves the drawer's state. Based on the state, the application can also track a number of times the drawer 108 has been opened or closed over a period of time or how long the drawer 108 has remained open. This allows the merchant (e.g., a manager) to review whether there is any unusual activity, e.g., the drawer has been opened or closed too many times, or the drawer was open at an unusual time of day.

The application running on the tablet computer 102 can associate an identity with every drawer action. When using the application, an employee can enter a personal identifier, e.g., an employee ID or a PIN, into a user interface of the tablet computer 102. The application can store the personal identifier and log the employee as using the device. When circuitry of the drawer 108 sends the state to the embedded host 804, which forwards the state to the tablet computer 102, the application can log the personal identifier with the state of the drawer, e.g., whether the drawer is opened or closed, at a certain timestamp. The employee can log out of the application using the user interface of the tablet computer 102.

The embedded host 804 can read data from the card reader 802 as described above in reference to FIG. 8.

In some implementations, the embedded host 804 includes a stand identification (stand ID) for the stand 104. Each stand can have a unique stand ID. For example, the stand ID can be stored in a configuration register. The stand ID can be determined when the stand 104 is manufactured.

In some implementations, the drawer 108 also includes circuitry, e.g., one or more configuration registers, for a drawer ID. Each drawer can have a unique drawer ID. The drawer ID can complement the stand ID. In some implementations, the IDs are generated during manufacturing. In alternative implementations, the mobile device 102 can pair a drawer ID and a stand ID when the point-of-sale system is initialized, e.g., when the stand 104 is first connected to the drawer 108, a merchant pairs the drawer and the stand using an application running on the mobile device 102.

The point-of-sale system can determine whether the stand is correctly paired with the drawer. The embedded host can access the drawer ID from the circuitry in the drawer 108. The embedded host can also access the stand ID. In some implementations, the embedded host determines whether the drawer ID and stand ID complement each other and notifies an application running on the mobile device 102. In other implementations, the mobile device 102 accesses the IDs from the embedded host 804 and makes the determination. In other implementations, the mobile device 102 accesses the IDs from the embedded host 804, and the drawer ID and stand ID are sent to a remote server, and the remote server makes the determination and sends an alert to the merchant, e.g., the mobile device 102 or another computer. If the IDs do not complement each other, the mobile device 102 can notify an external system of suspicious activity, e.g., a payment service system. This can deter fraud involving the drawer, e.g., the system can detect switching of a cash-filled drawer with an empty drawer.

Figure 10:
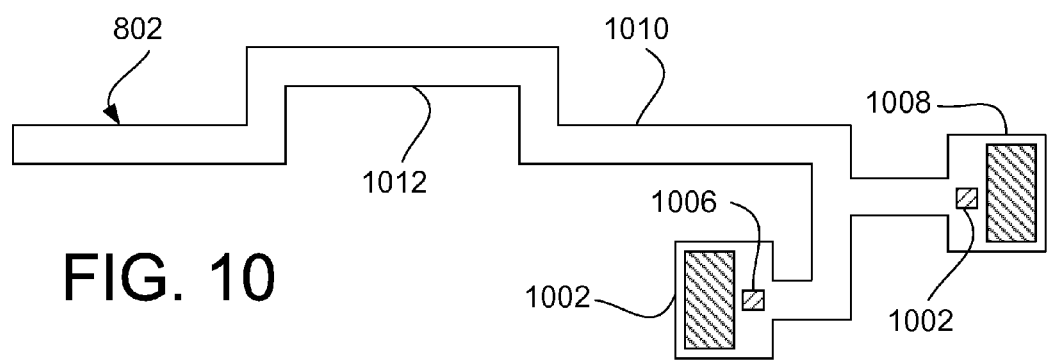
FIG. 10 is a view of example circuitry for a card reader.

FIG. 10 is a view of example circuitry for a card reader 202. In some implementations, the card reader 202 is a magnetic stripe reader. The magnetic stripe reader can be made from a flex circuit 802. The flex circuit 802 can include two read heads 1002, 1004. This allows a customer to swipe, in the card reader, a credit card in either orientation, e.g., with the card stripe facing either the customer or the merchant, through the slot 202a. The flex circuit 802 can be positioned so the read heads 1002, 1004 are position in the front portion 204 of the frame of the stand 104 on either side of the slot 202a, as shown in FIG. 8.

In some implementations, the card reader 202 is an EMV reader. The EMV reader can be a modified swipe card reader, e.g., a modified flex circuit with two read heads 1002, 1004. The modified flex circuit can communicate with a chip in a customer's card. For example, the customer can swipe or place the card in contact with the EMV reader. The EMV reader reads the data from the card and the mobile device 102 prompts the customer for a personal identification number (PIN). The mobile device 102 receives the customer's PIN and sends the PIN to the chip in the customer's card. The chip can verify whether the PIN matches with an internal PIN on the chip. The chip then notifies the EMV reader whether the PIN matches.

In some implementations, the card reader 202 is an NFC reader. The NFC reader can read NFC-supported devices (e.g., mobile phones or NFC cards) at a short-range distance using standard NFC protocols. The customer can place a card a short distance from the NFC reader. The NFC reader reads the card data and sends the data to the mobile device 102 for processing.

In some implementations, encryption circuits 1006, 1008 are located on the flex circuit 802 immediately adjacent the read heads 1002, 1004. The encryption circuits 1006, 1008 can be commercially available encryption ASICs. During assembly, each encryption circuit 1006, 1008 is potted with the adjacent the read head 1002, 1004, respectively. In some implementations, each read head 1002, 1004 contains hardware encryption. In either implementation, if a customer swipes a credit card, the card reader 202 immediately encrypts the card data from the read heads and sends the data to the embedded host 804. The card data is later decrypted in an external server (e.g., a payment server communicating with the tablet computer).

If the embedded host 804 is located in the back portion 208 of the frame 200, then the flex circuit 802 can include an extended strip 1010 that passes through the bottom portion 206 to connect the read heads 1002, 1004 to the embedded host 804. The strip 1010 can include an offset portion 1012 to provide clearance for the bearing 602 and/or any receiving aperture for the mechanical fastener.

Figure 11:
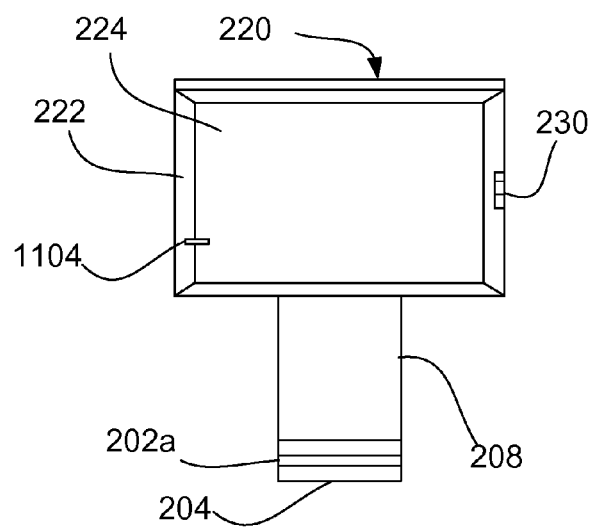
FIG. 11 is a top view of the stand, according to an example.
Figure 12:
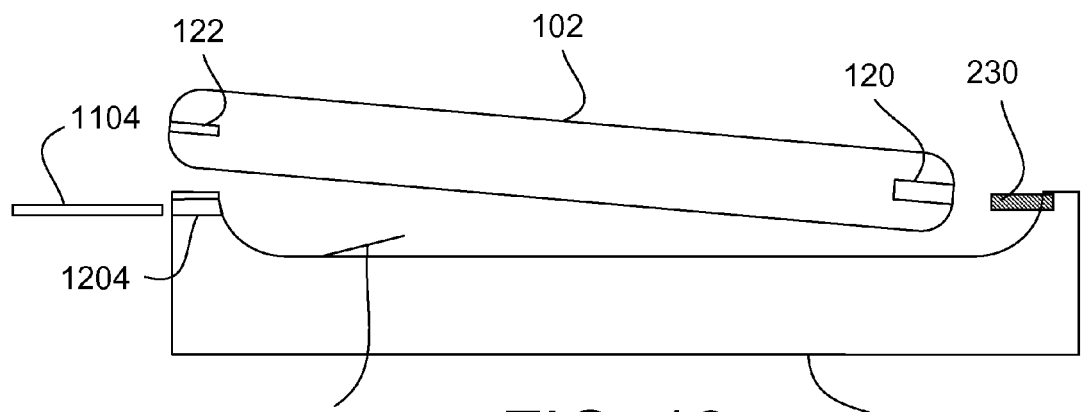
FIG. 12 is a view of a tablet computer being secured by the cradle, according to an example.

FIG. 11 is a top view of the stand 104. FIG. 12 is a view of a tablet computer 1102 being inserted into the cradle 220. When placed on the cradle 220, the tablet computer 102 can communicate with the embedded host 804 through the data connector 230. For example, if the cradle 220 is configured to support an iPad, then the data connector 230 can be the 30-pin Apple dock connector. In some implementations, the cradle includes a screw hole 1204 (see FIG. 12) configured to align to an audio port of the tablet computer. A screw 1104 can be inserted and extended into the screw hole. A tip of the screw 1104 can be configured to fit into a standard audio port; threading on shank of the screw can be located near the top of the screw 1104 to engage threading on the hole 1204.

When placed on the cradle 220, the tablet computer 102 can attach to the data connector 230 and be secured by the screw 1104. Since the data connector 230 and screw 1104 are inserted into the tablet computer 102 from opposite sides, the tablet computer 102 is securely held on the cradle 220. This configuration permits the tablet computer to be secured to stand 104 in such a manner that although the table computer is detachable (i.e., by removing the screw 1104) it cannot be quickly removed, thereby preventing a quick theft of either the stand 104 or the tablet computer 102. In some implementations, a spring 1202 is attached to the cradle 220. The spring 1202 can push the tablet computer 1102 out of the cradle 220 when the screw 1104 is removed from the audio port of the tablet computer 1102.

Figure 13A:
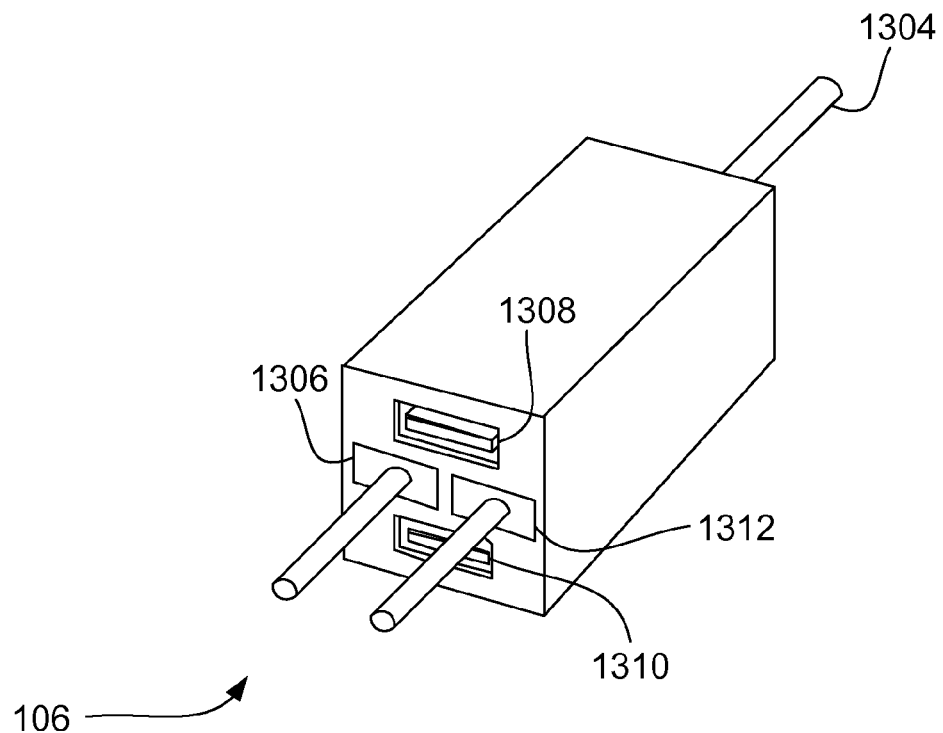
FIG. 13A is a perspective view of an example hub connected to the stand.

FIG. 13A is a perspective view of an example hub 106 connected to the stand 104. The hub 106 is an enclosure that includes a chipset, a power source 1304, a device port 1306, and other ports for peripheral devices. The hub's chipset is configured to relay data between peripheral devices connected to the hub and the tablet computer (e.g., through the embedded host 804). The device port 1306 provides a communication bridge between the chipset and the tablet computer (e.g., through the wire 704 in the stand 104). The device port 1306 can also provide power to the stand's circuitry through the power source 1304.

Figure 13B:
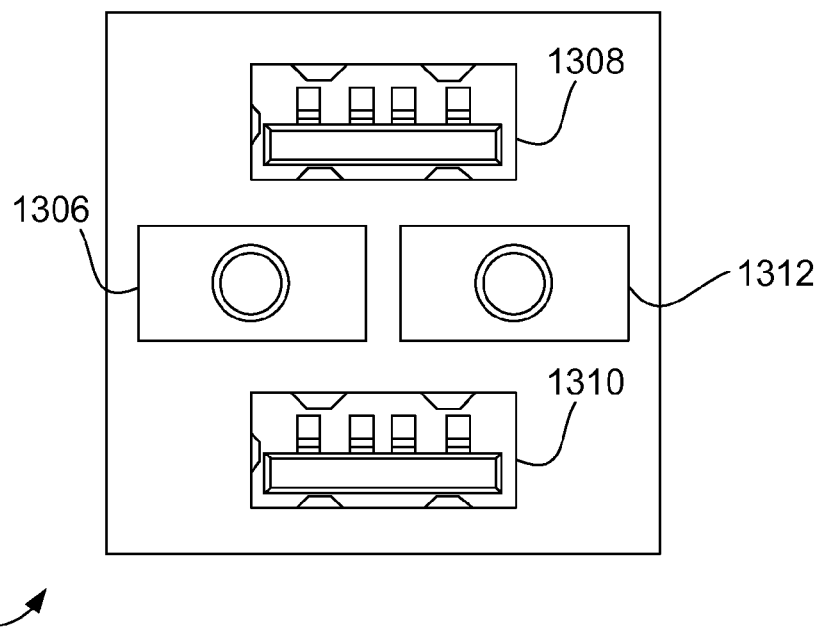
FIG. 13B is a frontal view of the example hub.

FIG. 13B is a frontal view of the example hub 106. In some implementations, the hub 106 includes a drawer port 1312. The drawer port 1312 can be a communication bridge between the chipset and circuitry in the drawer 108 (e.g., the cash drawer). The chipset can relay information sent from the tablet computer to the drawer, and vice-versa. The drawer port 1312 can be a nonstandard port with a ground line, a voltage supply line that provides extra power, e.g., at 12 volts, to a connected peripheral device, and two data lines. The hub (and the embedded host) can be configured to communicate data on the data lines using Universal Serial Bus (USB) communication protocols. In some implementations, the hub 106 includes peripheral ports 1308 and 1310. The peripheral ports can be connected to external devices supported by the chipset. For example, the external printer 110 can be connected to the peripheral port 1308 or 1310. As another example, the bar code reader 112 can be connected to the peripheral port 1308 or 1310. In some implementations, the peripheral ports are standard Universal Serial Bus (USB) ports.

Figure 14:
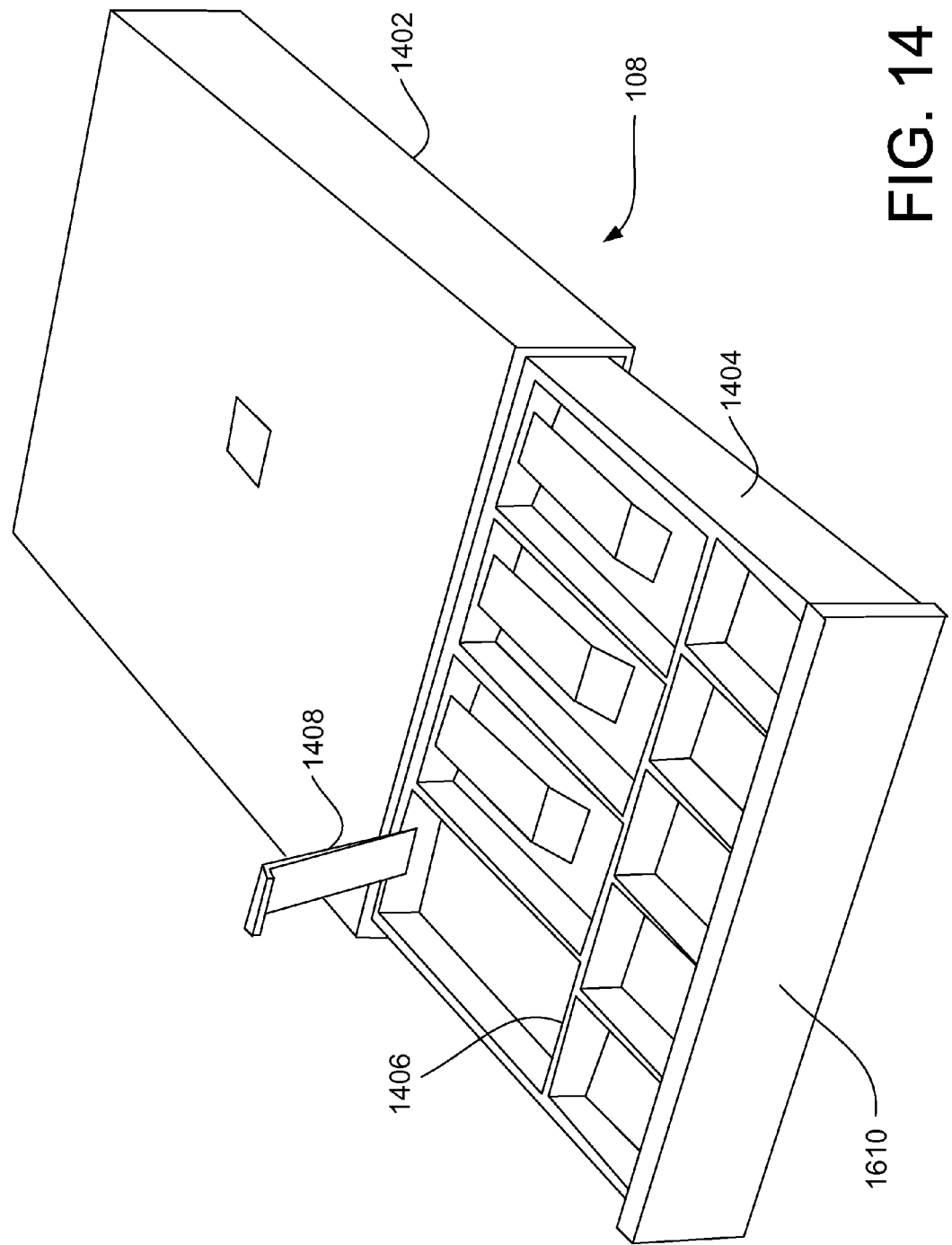
FIG. 14 is a perspective view of an example drawer that is open.

FIG. 14 is a perspective view of an example drawer 108 that is open. FIG. 15A is a perspective view of a closed drawer 108. FIG. 15B is a top view of the closed drawer 108. FIG. 15C is a side view of the closed drawer 108. The drawer 108 can be connected to the hub 106 (or directly to the stand 104). The drawer 108 includes various electronic components, and in some implementations the drawer 108 is powered by the power source of the hub.

The drawer 108 includes a drawer enclosure 1402 that holds a slidable drawer 1404. The enclosure 1402 can be a generally rectangular parallelepiped, with the slidable drawer 1404 fitting into an opening in the front side of the enclosure 1402.

In some implementations, the slidable drawer 1404 includes a tray 1406. The tray 1406 can be removable from the slidable drawer 1405. The tray 1406 can be divided into a plurality of compartments, and can have one or more flippers (e.g., a flipper 1408) to store cash. The tray 1406 can also store coins or other forms of payment (e.g., coupons).

Figure 16:
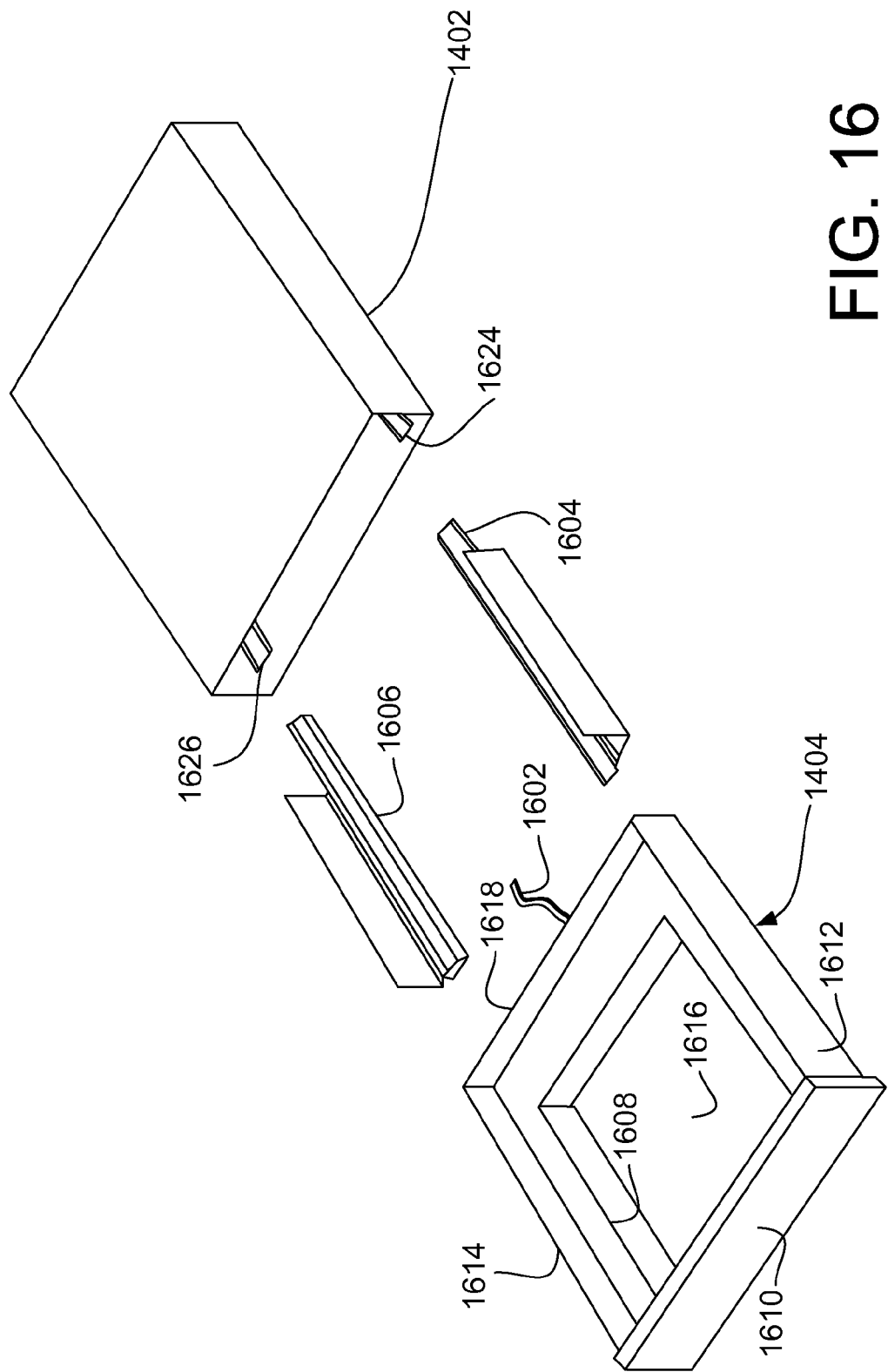
FIG. 16 is an exploded view showing some structural components of the drawer, according to an example.

FIG. 16 is an exploded view showing some structural components of the drawer 108. The slidable drawer 1404 includes a front face 1610, a first side face 1614, a second side face 1612, a bottom face 1616, and a back face 1618. The drawer 1404 also includes an inner shell 1608. The inner shell 1608 is positioned in the interior of the drawer and attaches to and runs along all sides of the drawer (e.g., the front, sides, back, and bottom faces). In some implementations, the inner shell 1608 is formed to support the tray 1404 (in reference to FIG. 14).

The drawer also includes two parallel sliding rails 1604, 1606. The sliding rails 1604, 1606 are positioned under the inner shell 1608 so that the rails 1604, 1606 are covered when the drawer 108 is opened and viewed from above (see FIG. 14). The sliding rails 1604, 1606 extend parallel to the first and second side faces 1612, 1614. The sliding rail 1606 is attached to the first side face 1614. The sliding rail 1604 is attached to the second side face 1612. Alternatively or in addition, the sliding rails 1604, 1606 are attached to the inner shell 1608.

The drawer enclosure 1402 includes rail supporters 1624, 1626 to slidably receive the two sliding rails 1604, 1606. For example, a merchant can open and close the drawer 1404 by applying a pushing or pulling motion on the sliding rails 1604, 1606. The rail supporters 1624, 1626 are also not visible from a top view when the drawer is open since the rail supporters 1624, 1626 are hidden by the back face 1618 of the slidable drawer 1404. In some implementations, a cable 1602 is attached to the drawer to prevent the slidable drawer 1404 from being detached from the drawer enclosure 1402. The cable can be a metal catch.

As shown in FIGS. 15A-15C, when closed, back surface of the front face 1610 of the slidable drawer 1404 can directly contact the front surface of the enclosure 1402 so that there is effectively no gap between the slidable drawer 1404 and the enclosure 1402. The reduced gap improves security (e.g., by making it more difficult to insert a crowbar or other tool to pry open the drawer).

Figure 17:
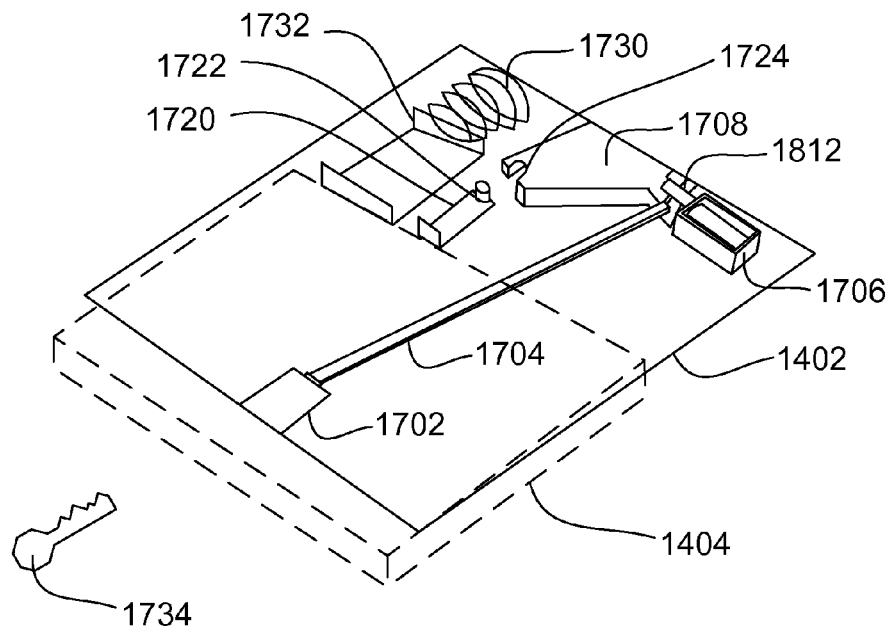
FIG. 17 is a bottom view of components inside of the drawer enclosure, with the slidable drawer shown in phantom, according to an example.

FIG. 17 is a bottom view of components inside of the drawer enclosure 1402, with the slidable drawer 1404 shown in phantom. The drawer 108 includes a latch 1708 and a solenoid 1706.

In general, the latch 1708 holds the slidable drawer 1404 locked in a closed position (as shown in FIGS. 15A-15C). For example, a bracket 1720 can extend from the back of the slidable drawer 1404, and a pin 1722 can extend vertically from the bracket 1720 and be captured by a slot 1724 in the latch 1708. In the closed and locked state, the latch 1724 is positioned and held so that an edge of the slot 1724 prevents forward movement of the pin 1722, and thus prevents forward movement of the slidable drawer 1404.

The slidable drawer 1404 can be released from the drawer enclosure 1402 using the solenoid 1706. For example, the tablet computer 102 can send a command (e.g., through the embedded host 804) to open the drawer 1404. The command triggers the solenoid 1706 to move the latch 1708 and release the drawer 1404. The command can be sent at the end of a transaction, e.g., when the customer is making a cash payment, or when the manager slides a manager's card through the card reader 202. For example, in some implementations, the solenoid 1706 can move a part so that the latch 1724 is be permitted to swing freely. Because the latch 1724 can swing to release the pin 1722, the drawer is free to open.

A spring 1730 can positioned between the back of the enclosure and the back surface of the slidable drawer 1404 to apply a force to cause the slidable drawer 1404 to slide forward out of the enclosure 1402. In some implementations, the spring 1730 can bear against a bracket 1732 that extends from the back of the slidable drawer 1404.

In addition, the drawer 108 can optionally include a locking mechanism 1702 and an actuating mechanism 1704. The drawer 1404 can be released through the locking mechanism 1402. For example, it may be necessary to unlock the drawer 108 when there is a power failure and no power to actuate the solenoid. The locking mechanism 1702 can be attached to the bottom of the drawer enclosure 1402. For example, a merchant can quickly access the cash drawer by inserting a master key 1734 into the locking mechanism 1702. When the locking mechanism 1702 receives a valid key, insertion of the valid key creates a force that engages the actuating mechanism 1704 with the latch 1708. For example, the locking mechanism can be configured so that only a valid key will be permitted to extend through the lock so that the tip of the key bears against the actuating mechanism 1704. Movement of the latch 1708 then opens the drawer 1404. In some implementations, the locking mechanism 1702 is a linear lock and the actuating mechanism 1704 is a metal rod.

Figure 18:
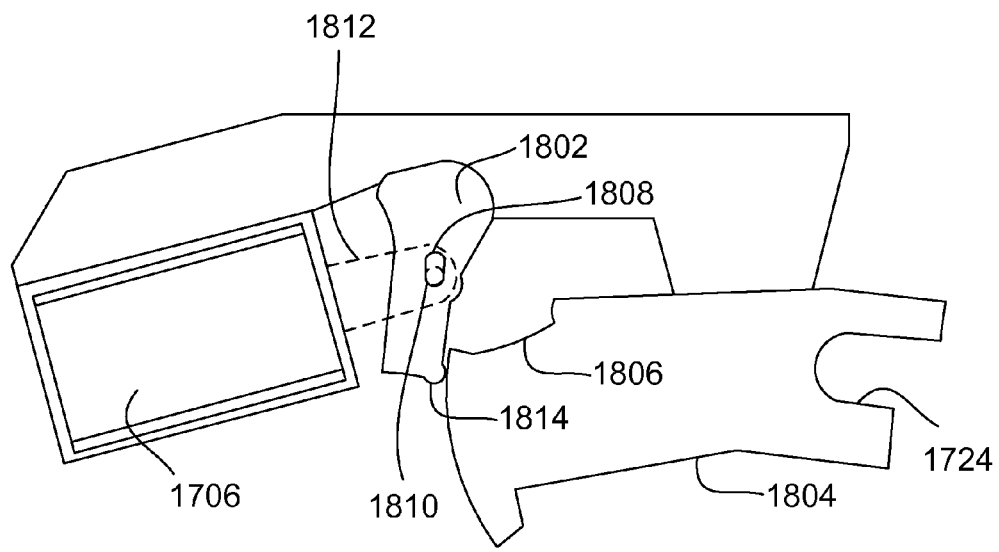
FIG. 18 is a top view of an example latch.

FIG. 18 is a top view of an example latch 1724. The latch as shown can be in a position when the drawer 108 is opened. The latch can include a first piece 1804 that is pivotally mounted to the enclosure 1402 and a second piece 1802 that is pivotally mounted to the enclosure 1402. The solenoid 1706 can be attached to the second piece 1802. For example, a pin 1810 extending upwardly from the actuatable rod 1812 (shown in phantom) of the solenoid 1706 can pass through a slot (or hole) 1808 in the second piece 1802.

When the drawer is closed, the pin 1722 fits into the recess 1724 on one end of the first piece 1804, and an edge 1814 of the second piece 1802 bears against the back surface of the first piece 1804, e.g., at a recess 1806. The presence of the second piece 1802 prevents the first piece 1804 from rotating clockwise, and thus prevents the first piece 1804 from swiveling, thus holding the pin 1822 and keeping the drawer 108 closed. To open the drawer, the solenoid 1706 can apply a pulling force to dislodge the second piece 1802 from bearing against the back surface of the first piece 1804. Alternatively, the actuating mechanism 1704 can apply a force to the second piece 1802 that dislodges the second piece 1802 from bearing against the back surface of the first piece 1804. In either situation, the first piece 1804 is then free to rotate clockwise to release the pin 1822 and the slidable drawer 1404 is free to open.

A first spring can apply a torque to the first piece 1804 that causes the first piece 1804 to tend to rotate clockwise. A second spring can apply a torque to the second piece 1802 that causes the second piece 1802 to tend to rotate counter-clockwise.

Figure 19:
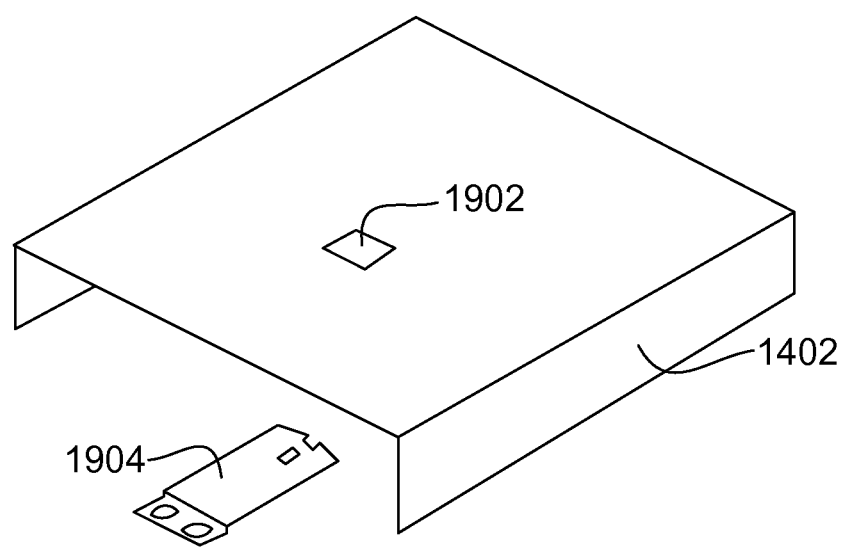
FIG. 19 is an exploded view of the top of the drawer enclosure, according to an example.

FIG. 19 is an exploded view of the top of the drawer enclosure 1402. The drawer enclosure 104 can include an opening 1902. In some implementations, a plug can be releasably inserted in the opening. The plug can include an indicia of the manufacturer (e.g., an object displaying the company logo) or other artistic feature or serve as a placeholder. A fastener 1904 can be slidably secured to the inside of the top of the drawer enclosure 1402. The fastener can 1904 lock an object that is inserted through the opening 1902 to the drawer enclosure 1402.

For example, to secure the stand 104 to the top of the drawer 108, a fixture with an appropriate mating feature can be secured to the bottom of the stand 104, e.g., with a screw that is inserted into the opening 1902. A user, e.g., a merchant can pull back (e.g., trigger) the fastener 1904, place the mating feature of the fixture into the opening 1902, and aligning the mating feature with a slot or hole in the fastener 1904. The user then releases the fastener 1904 to hold the fixture in place. In some implementations, the fastener 1904 is a latch. To release a fastened object (e.g., whether it is the plug or the stand), a user can pull back the fastener 1904, then pull the fixture upwardly out of the opening 1902.

Although the description above focuses on a stand that supports a tablet computer, for some applications, another type of mobile device, e.g., a smart phone, could be used in place of the tablet computer. A tablet computer has an advantage of a larger screen than a smart phone, which can make use of the point-of-sale system easier for the merchant.

In some implementations, a customer can conduct a cardless payment transaction with the merchant using the stand. The cardless payment transaction is described in U.S. Patent Application (Ser. No. 61/563,022), filed on Nov. 22, 2011, entitled "Cardless Payment Transactions," which is incorporated by reference herein in its entirety. With cardless payment transactions, the card reader in the stand is optional.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A stand for supporting a tablet computer;
  a frame including a horizontally extending bottom portion, a front portion extending vertically from a front end of bottom portion, and a back portion extending vertically from a back end of the bottom portion;
  a cradle attached to the back portion of the frame and configured to releasably support the tablet computer with a face of the tablet computer at an oblique angle relative to the bottom portion, a top surface of the front end of the frame positioned lower than a bottom edge of the cradle, the cradle including a data connector configured to mate to a data port of the tablet computer;
  a card reader including a vertical slot in the front portion of the frame, the slot parallel to a horizontal axis in a plane defined by the face of the tablet computer;
  circuitry configured to direct signals from the card reader to the data connector; and
  wherein the frame is weighted such that a center of gravity of the stand with the tablet computer supported on the cradle is in front of the bottom edge of the cradle.

2. The stand of claim 1, wherein the card reader comprises a card stripe reader or a card chip reader.

3. The stand of claim 2, further comprising a near-field communication card reader positioned in the back portion.

4. The stand of claim 2, wherein the vertical slot extends across an entire width of the front portion.

5. The stand of claim 1, wherein the oblique angle is between about 40° and 65°.

6. The stand of claim 1, wherein the cradle is pivotally attached to the back portion of the frame and rotatable about a horizontal axis, and the slot extends parallel to the horizontal axis.

7. The stand of claim 1, comprising a base supporting the frame, the frame pivotally attached to base and rotatable relative to the base about a vertical axis.

8. The stand of claim 7, wherein the frame is rotatable about the vertical axis between a first orientation and a second orientation.

9. The stand of claim 8, wherein the first orientation is at a 180° angle relative to the first orientation.

10. The stand of claim 8, further comprising a detent mechanism to hold the frame at the first orientation and the second orientation.

11. The stand of claim 8, further comprising a stop to prevent the frame from rotation past the first orientation and from rotation past the second orientation.

12. The stand of claim 7, further comprising wiring in the base to receive electrical power, the wiring electrically connected to the circuitry to provide power to the data connector, the wiring remaining immobile when the frame rotates about the vertical axis.

13. The stand of claim 12, comprising a cable connecting the wiring to the circuitry, the cable extending between a first stationary opening in the base and a second opening that rotates with the frame.

14. The stand of claim 12, wherein the wiring comprises a data and power cable extending from the base.

15. The stand of claim 7, further comprising an aperture configured to receive a mechanical fastener.

16. The stand of claim 15, wherein the stand is positioned on a table or counter and the fastener extends through a hole in the table or counter into the aperture to secure the stand to the table or counter.

17. The stand of claim 15, wherein the aperture is aligned with the vertical axis.

18. The stand of claim 17, wherein the frame pivotally attached to base by a rotatable annular bearing and the aperture extends through an opening through the bearing.

19. The stand of claim 1, wherein the cradle includes a screw hole configured to align to an audio port of the tablet computer.

20. The stand of claim 19, further comprising a screw inserted into the screw hole and having a portion extending into the audio port.

21. The stand of claim 19, wherein the screw hole is positioned on a side of the frame opposite the data connector.

22. The stand of claim 1, wherein the frame comprises a shell of a first material and a body of a second material that is denser than the first material, the body located in the bottom portion of the frame inside the shell.

23. A stand for supporting a tablet computer;
a frame including a horizontally extending bottom portion, a front portion extending vertically from a front end of bottom portion, and a back portion extending vertically from a back end of the bottom portion;
a base supporting the frame, the frame pivotally attached to base and rotatable relative to the base about a vertical axis;
wiring in the base configured to receive electrical power, the wiring electrically connected to the circuitry to provide power to the data connector, the wiring remaining immobile when the frame rotates about the vertical axis;
a cradle attached to the back portion of the frame and configured to releasably support the tablet computer with a face of the tablet computer at an oblique angle relative to the bottom portion, a top surface of the front end of the frame positioned lower than a bottom edge of the cradle, the cradle including a data connector configured to mate to a data port of the tablet computer;
a card reader including a vertical slot in the front portion of the frame, the slot parallel to a horizontal axis in a plane defined by the face of the tablet computer; and
circuitry configured to direct signals from the card reader to the data connector.

24. The stand of claim 23 wherein the card reader comprises a card stripe reader or a card chip reader.

25. The stand of claim 23 further comprising a near-field communication card reader positioned in the back portion.

26. The stand of claim 23 wherein the vertical slot extends across an entire width of the front portion.

27. The stand of claim 23 wherein the oblique angle is between about 40° and 65°.

28. The stand of claim 23 wherein the cradle is pivotally attached to the back portion of the frame and rotatable about a horizontal axis, and the slot extends parallel to the horizontal axis.

29. A stand for supporting a tablet computer;
a frame including a horizontally extending bottom portion, a front portion extending vertically from a front end of bottom portion, and a back portion extending vertically from a back end of the bottom portion;
a cradle attached to the back portion of the frame and configured to releasably support the tablet computer with a face of the tablet computer at an oblique angle relative to the bottom portion, a top surface of the front end of the frame positioned lower than a bottom edge of the cradle, the cradle including a data connector configured to mate to a data port of the tablet computer;
a card reader including a vertical slot in the front portion of the frame, the slot parallel to a horizontal axis in a plane defined by the face of the tablet computer;
circuitry configured to direct signals from the card reader to the data connector; and
wherein the cradle includes a screw hole configured to align to an audio port of the tablet computer.

30. The stand of claim 29 wherein the card reader comprises a card stripe reader or a card chip reader.

31. The stand of claim 29 further comprising a near-field communication card reader positioned in the back portion.

32. The stand of claim 29 wherein the vertical slot extends across an entire width of the front portion.

33. The stand of claim 29 wherein the oblique angle is between about 40° and 65°.

34. The stand of claim 29 wherein the cradle is pivotally attached to the back portion of the frame and rotatable about a horizontal axis, and the slot extends parallel to the horizontal axis.

* * * * *